(12) United States Patent
Zhang et al.

(10) Patent No.: US 12,693,957 B2
(45) Date of Patent: Jul. 28, 2026

(54) ACCESSIBILITY VERIFICATION TESTING

(71) Applicant: International Business Machines Corporation, Armonk, NY (US)

(72) Inventors: Yuan Jie Zhang, Ningbo (CN); Yi Chen Huang, Taipei (TW); Bo Zhang, Ningbo (CN); Tony Ping-Chung Yang, Taipei (TW); Huai Ying Hy Xia, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 298 days.

(21) Appl. No.: 18/452,620

(22) Filed: Aug. 21, 2023

(65) Prior Publication Data

US 2025/0068542 A1     Feb. 27, 2025

(51) Int. Cl.
  G06F 11/07      (2006.01)
  G06F 9/44       (2018.01)
      (Continued)

(52) U.S. Cl.
  CPC .......... G06F 11/3604 (2013.01); G06F 9/451 (2018.02); G06F 3/0238 (2013.01);
      (Continued)

(58) Field of Classification Search
  CPC .. G06F 11/3604; G06F 9/451; G06F 21/6218; G06F 16/9577; G06F 3/0238; G06F 3/0484; G06F 3/167
  See application file for complete search history.

(56) References Cited

U.S. PATENT DOCUMENTS 7,840,948 B2    11/2010  Chace
8,667,468 B2     3/2014  Breeds
        (Continued)

OTHER PUBLICATIONS

Ying Ma et al., Icon Label Generation for Mobile Applications by Mean Teacher Learning, Jul. 29, 2022, [Retrieved on Mar. 5, 2026]. Retrieved from the internet: <URL: https://assets-eu.researchsquare.com/files/rs-1888657/v1_covered.pdf?c=1662767968> 23 Pages (1-23) (Year: 2022).*

(Continued)

*Primary Examiner* — Anibal Riveracruz
(74) *Attorney, Agent, or Firm* — Rakesh Roy

(57)          ABSTRACT

A computer-implemented method includes identifying a webpage comprising a set of user interface (UI) elements, analyzing the set of user UI elements to identify a set of interactable elements, classifying the elements of the set interactable elements as either focusable or not focusable, extracting features from source code corresponding to interactable elements of the set of interactable elements classified as focusable, and building an accessibility issue detection model using the extracted features from source code corresponding to focusable interactable elements as training data. The method may further include extracting features from source code corresponding to interactable elements classified as not focusable and updating the accessibility issue detection model using the extracted features from source code corresponding to interactable elements which are not focusable as training data. The method may further include storing one or more passed results and one or more failed results in a results database.

20 Claims, 11 Drawing Sheets

(51) Int. Cl.

| | |
|---|---|
| *G06F 9/451* | (2018.01) |
| *G06F 11/36* | (2025.01) |
| *G06F 11/3604* | (2025.01) |
| *G06F 11/3668* | (2025.01) |
| *G06F 3/023* | (2006.01) |
| *G06F 3/0484* | (2022.01) |
| *G06F 3/16* | (2006.01) |
| *G06F 16/957* | (2019.01) |
| *G06F 21/62* | (2013.01) |

(52) U.S. Cl.
CPC ............ *G06F 3/0484* (2013.01); *G06F 3/167* (2013.01); *G06F 16/9577* (2019.01); *G06F 21/6218* (2013.01)

(56) References Cited

U.S. PATENT DOCUMENTS

| | | | |
|---|---|---|---|
| 8,819,192 B2 | 8/2014 | Hu | |
| 11,262,979 B2 | 3/2022 | Deshmukh | |
| 12,443,671 B2 * | 10/2025 | Page | G06F 11/0784 |
| 2016/0054985 A1 * | 2/2016 | Cragun | G06F 8/38 |
| | | | 715/762 |
| 2019/0042397 A1 * | 2/2019 | Vignesh R | G06F 11/3692 |
| 2022/0366131 A1 * | 11/2022 | Ekron | G06F 9/453 |
| 2023/0074584 A1 | 3/2023 | Chiou | |
| 2024/0192837 A1 * | 6/2024 | Chiou | G06F 3/0484 |

OTHER PUBLICATIONS

Chiou et al., "BAGEL: An Approach to Automatically Detect Navigation-Based Web Accessibility Barriers for Keyboard Users", CHI '23, Apr. 23-28, 2023, 17 pages, <https://dl.acm.org/doi/abs/10.1145/3544548.3580749>.

Disclosed Anonymously, "Automated testing the keyboard accessibility of a user interface by replacing click events with generated tab events", An IP.com Prior Art Database Technical Disclosure, IP.com No. IPCOM000263835D, IP.com Electronic Publication Date: Oct. 9, 2020.

* cited by examiner

400

| TYPE | ELEMENT ATTRIBUTES | EXAMPLE |
|---|---|---|
| Button | \<button> tag<br>type=button<br>role=button/tab/tablist/radio/checkbox | \<button>...\</button><br>\<div role="checkbox">...\</div> |
| Link | \<a> tag<br>role=link | \<a>...\</a><br>\<span role="link">...\</span> |
| Drop down list | \<select>tag<br>role=listbox/combobox | \<select>...\</select><br>\<div role="listbox">...\</div> |
| User input<br>(Text) | \<input> tag or \<textarea> tag<br>type=text/search<br>role=search/searchbox/textbox | \<input type="search"><br>\<div role="textbox">...\</div> |
| User input<br>(Non-text) | \<input> tag with following attributes:<br>type=button/submit/reset/radio/checkbox | \<input type="button"><br>\<input type="radio"> |
| Other | With event listener<br>With tabindexattribute | \<img onclick=" ... "><br>\<div tabindex="0">...\</div> |

| Unique ID | Element Name | Element ID | Style | Properties | Event Handle | Label |
|---|---|---|---|---|---|---|
| id1 | div | div-target | class1 | role="checkbox" | onClick, onKeyDown | Passed |
| id2 | span | span-search | class2 | role="button" | onClick, onKeyDown | Passed |
| id3 | select | span-language | class3 | role="listbox" | onClick | Failed |
| id4 | img | img-sample | class4 | role="link" | onClick | Failed |
| id5 | input | input-keyword | class5 | role="textbox" | onClick | Failed |
| id6 | section | section-approval | class6 | role="dropdown" | onClick | Failed |
| id7 | link | link-feedback | class7 | role="button" | onClick, onKeyDown | Passed |
| id8 | button | button-service | class8 | role="menuitem" | onClick, onKeyDown | Passed |
| ... | ... | ... | ... | ... | ... | ... |

FIG. 5

```
import React from "react";
function MyButton() {
const onClick= () => {
alert("Clickme,Iamadivasabutton!");
};

return (
<divclassName="myClass" onClick={onClick}>
Click me
</div>
);
}
export default MyButton;
```

602

```
import React from "react";
function MyButton() {const onClick= () => {
alert("Clickme,Iamadivasabutton!");
};

const onKeyDown = (event) => {
if (event.key === "Enter") {
alert("Clickme,Iamadivasabutton!");
}
};

return (
<divclassName="myClass"
// set tabIndexto allow the div to be
focusable
tabIndex={0}
onClick={onClick}>
onKeyDown={onKeyDown}>
Click me
</div>
);
}
export default MyButton;
```

ACCESSIBILITY VERIFICATION TESTING

BACKGROUND OF THE INVENTION

The present invention relates generally to the field of accessibility, and more specifically to minimizing the need for manual intervention in accessibility detection.

The capability for software to allow people with disabilities to access and use it is known as "accessibility". In many cases, accessibility is a legal requirement. Computer accessibility (also known as accessible computing) refers to the accessibility of a computer system to all people, regardless of any disability type or severity of impairment. The term accessibility is most often used in reference to specialized hardware or software, or a combination of both, designed to enable the use of a computer by a person with a disability or impairment. Common accessibility features include text-to-speech, closed-captioning, keyboard shortcuts, and the like. More specific technologies requiring additional hardware may be referred to as assistive technology. Similar to computer accessibility, web accessibility refers to the practice of making the use of the World Wide Web easier for individuals with disabilities.

Accessibility verification testing (AVT) is a way to confirm the accessibility of products. Testers run tools to validate that all issues discoverable by automated testing have been identified and resolved. They then complete a manual inspection and keyboard check of the product, before confirming elements are usable with a screen reader. AVT manual testing is divided into steps. A visual inspection is followed by pointer and keyboard checks. Testers then validate the ability of the content to resize. They complete manual testing by confirming the accessibility of interactions.

SUMMARY

Embodiments of the present invention disclose a computer-implemented method, a computer program product, and a system for detecting accessibility issues. The method includes identifying a webpage comprising a set of user interface (UI) elements, analyzing the set of user UI elements to identify a set of interactable elements, classifying the elements of the set interactable elements as either focusable or not focusable, extracting features from source code corresponding to interactable elements of the set of interactable elements classified as focusable, and building an accessibility issue detection model using the extracted features from source code corresponding to focusable interactable elements as training data. The method may further include extracting features from source code corresponding to interactable elements classified as not focusable and updating the accessibility issue detection model using the extracted features from source code corresponding to interactable elements which are not focusable as training data. The method may further include storing one or more passed results and one or more failed results in a results database.

BRIEF DESCRIPTION OF THE DRAWINGS

FIG. 4 depicts a table comprising UI element types and corresponding element attributes and examples in accordance with at least one embodiment of the present invention;

FIG. 5 depicts an interactive elements table in accordance with at least one embodiment of the present invention;

FIG. 6 depicts sample source code in accordance with at least one embodiment of the present invention;

DETAILED DESCRIPTION

Verifying operation using a keyboard is a part of manual accessibility testing. For example, with respect to a webpage, confirming a webpage's accessibility may include confirming that all operable web elements can be focused and operable using a keyboard. In many cases, manual testing of this nature can be very time consuming. Embodiments of the present invention therefore recognize a need to automate the detection of keyboard accessibility issues, thereby greatly improving testing efficiency with respect to accessibility verification. Further, embodiments of the present invention may enable detection of keyboard accessibility issues at source code level during the development process, rather than waiting until a build is deployed and a web page is rendered.

One example of keyboard manual testing in an accessibility environment could include using the "Tab" and the "Shift+Tab" keys/key combinations to navigate between widgets such as menus, trees, and grids. Once a widget has keyboard focus, use the arrow keys, spacebar/space key, enter key, or other keyboard commands to navigate the options of the widget, change its state, or trigger an application function. Using the keyboard keys in this fashion replaces the need to use a mouse input to navigate the widget.

Comparing to traditional manual testing, embodiments of the present invention improve efficiency by minimizing the required manual effort. Embodiments of the present invention may further enable accessibility issues to be identified early in a development phase to reduce deployment risk. Further, embodiments of the present invention have no device dependencies, and can therefore be implemented even in the absence of specific devices which may be required to implement manual testing.

It should be appreciated that while many of the described embodiments associated with the Figures are directed towards accessibility analysis with respect to a keyboard and a mouse, other embodiments of aspects of the present invention may be directed towards any number of user input devices beyond strictly a mouse and keyboard; the mouse and keyboard embodiments are intended to be exemplary rather than exhaustive or limiting.

Figure 1:
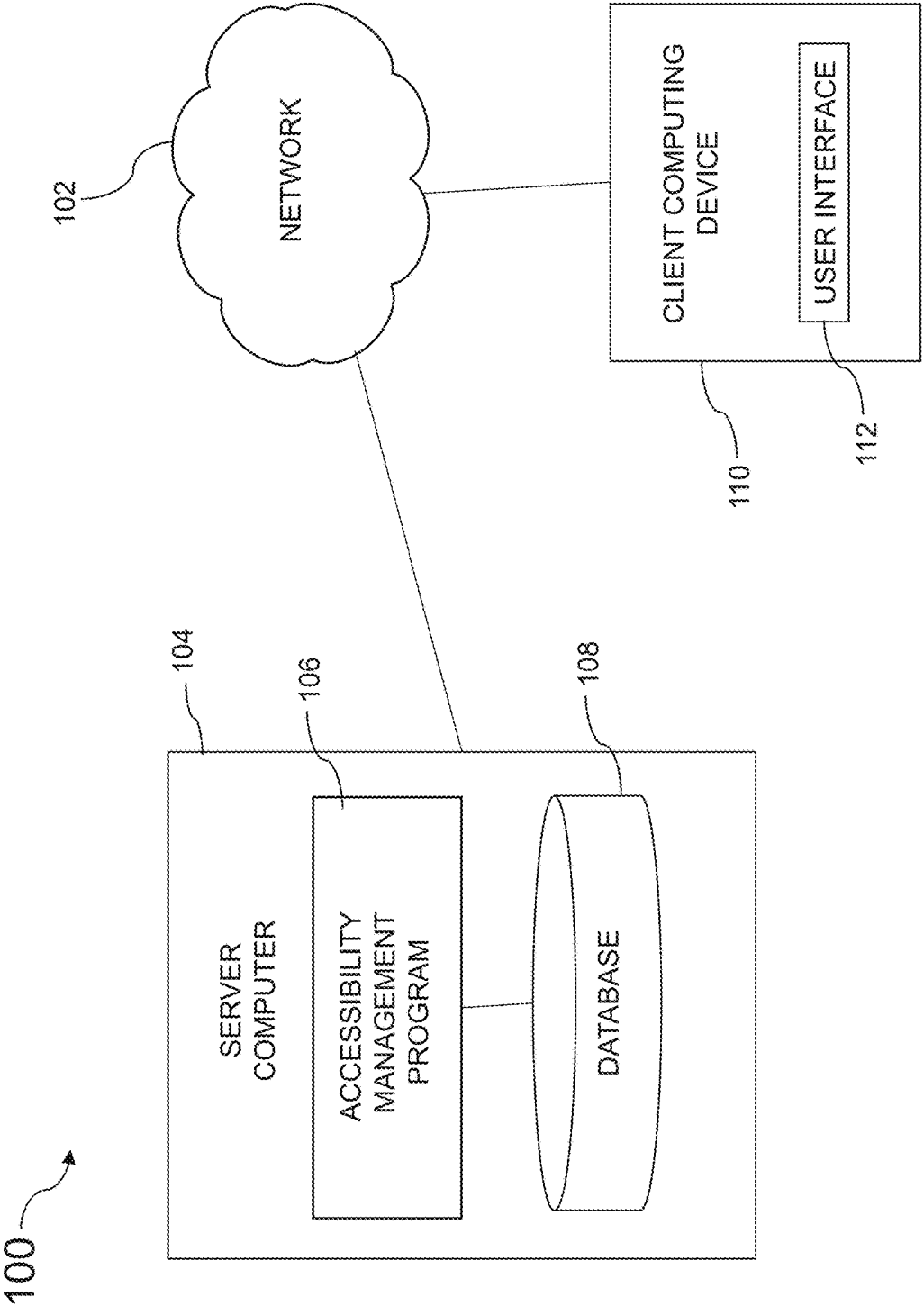
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 110 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 110, and other computing devices (not shown) within distributed data processing environment 100. Distributed data processing environment 100 may be implemented in computing environment 1000 shown in FIG. 10.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, an edge device, a containerized workload, or any programmable electronic device capable of communicating with client computing device 110 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes accessibility management program 106 and database 108. Server computer 104 may include internal and external hardware components, as depicted and described in further detail with respect to computer 1001 of FIG. 10.

Accessibility management program 106 may be configured to conduct accessibility verification methods to analyze an element's accessibility features. In at least some embodiments, accessibility management program 106 may be configured to execute an accessibility testing method. One example of an appropriate accessibility testing method is described with respect to accessibility testing method 300 depicted in FIG. 3. In at least some embodiments, accessibility management program 106 is configured to execute a data analysis method. One example of an appropriate data analysis method is described with respect to data analysis method 900 depicted in FIG. 9. One embodiment of an appropriate accessibility management program 106 and its corresponding components is depicted and described in further detail with respect to FIG. 2.

In the depicted embodiment, database 108 resides on server computer 104. In another embodiment, database 108 may reside elsewhere within distributed data processing environment 100, provided that accessibility management program 106 has access to database 108, via network 102. A database is an organized collection of data. Database 108 can be implemented with any type of storage device capable of storing data and configuration files that can be accessed and utilized by accessibility management program 106 such as a database server, a hard disk drive, or a flash memory. Database 108 stores information used by and generated by accessibility management program 106.

The present invention may contain various accessible data sources, such as database 108, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Accessibility management program 106 enables the authorized and secure processing of personal data. Accessibility management program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Accessibility management program 106 provides information regarding personal data and the nature (e.g., type, scope, purpose, duration, etc.) of the processing. Accessibility management program 106 provides the user with copies of stored personal data. Accessibility management program 106 allows the correction or completion of incorrect or incomplete personal data. Accessibility management program 106 allows the immediate deletion of personal data.

Client computing device 110 can be one or more of a laptop computer, a tablet computer, a smart phone, smart watch, a smart speaker, or any programmable electronic device capable of communicating with various components and devices within distributed data processing environment 100, via network 102. Client computing device 110 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In an embodiment, the wearable computer may be in the form of a smart watch. In one embodiment, the wearable computer may be in the form of a head mounted display (HMD). The HMD may take the form-factor of a pair of glasses, such as augmented reality (AR) glasses, which is a device for viewing mixed reality and/or augmented reality scenarios. In the embodiment where the HMD is a pair of AR glasses, the AR glasses can capture eye gaze information from a gaze point tracker, such as a camera associated with client computing device 110. In general, client computing device 110 represents one or more programmable electronic devices or combination of programmable electronic devices capable of executing machine readable program instructions and communicating with other computing devices (not shown) within distributed data processing environment 100 via a network, such as network 102. Client computing device 110 includes an instance of user interface 112.

User interface 112 provides an interface between accessibility management program 106 on server computer 104 and a user of client computing device 110. In one embodiment, user interface 112 is mobile application software. Mobile application software, or an "app," is a computer program designed to run on smart phones, tablet computers and other mobile devices. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In an embodiment, user interface 112 enables a user of client computing device 110 to input data to be used by accessibility management program 106.

Figure 2:
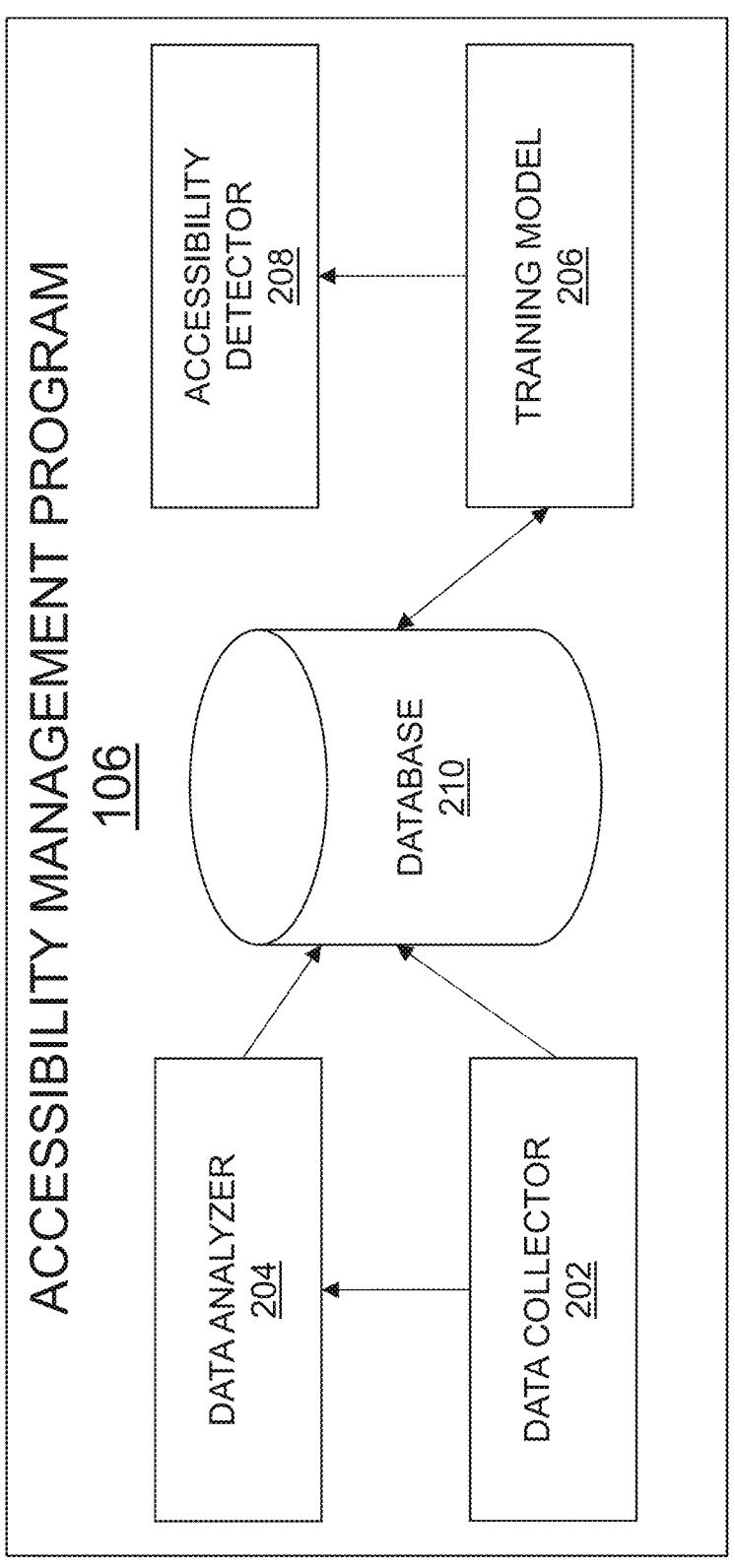
FIG. 2 is a functional block diagram depicting an accessibility management program in accordance with at least one embodiment of the present invention.

FIG. 2 is a functional block diagram depicting an accessibility management program 106 in accordance with at least one embodiment of the present invention. As depicted, accessibility management program 106 includes data collector 202, data analyzer 204, training model 206, accessibility detector 208, and database 210. Accessibility management program 106 may enable increased efficiency in accessibility testing.

Data collector 202 may be configured to collect interactive elements from a web page by scanning the web page for elements which are supposed to be focusable by both mouse and keyboard. In at least some embodiments, data collector 202 is configured to search the web page for elements which contain certain tags or attributes. Data collector 202 may be configured to gather these interactive elements such that they can be provided to training model 206 and used as training data.

Data analyzer 204 may be configured to analyze web page data or elements to determine whether the elements conform to accessibility requirements. In at least some embodiments, data analyzer 204 is configured to execute a data analysis method. One example of an appropriate data analysis method is data analysis method 900, as described with respect to FIG. 9. In general, data analyzer 204 analyzes the collected interactive elements to determine which can be operated via the keyboard. If the element cannot be operated through the keyboard, it is identified as an AVT defect, and the properties and characteristics of such an element is recorded in database 210 as training data.

Training model 206 may be configured to use training data to build a binary classification model which can predict whether the source code can pass keyboard accessibility testing. In at least some embodiments, training model 206 is configured to detect keyboard accessibility issues at source code level during the development process, rather than waiting for deployment.

Accessibility detector 208 may be configured to implement the binary classification model as built by training model 206. In other words, accessibility detector 208 utilizes the created binary classification model to determine whether a source code level element complies with accessibility verification requirements.

Database 210 can be implemented with any type of storage device capable of storing data and configuration files that can be accessed and utilized by the components of accessibility management program 106 such as a database server, a hard disk drive, or a flash memory. Database 210 stores information used by and generated by the components of accessibility management program 106. While database 210 is depicted as an element of accessibility management program 106, in other embodiments, such as the embodiment depicted with respect to FIG. 1, database 210 may be hosted separately from the other components of accessibility management program 106.

Figure 3:
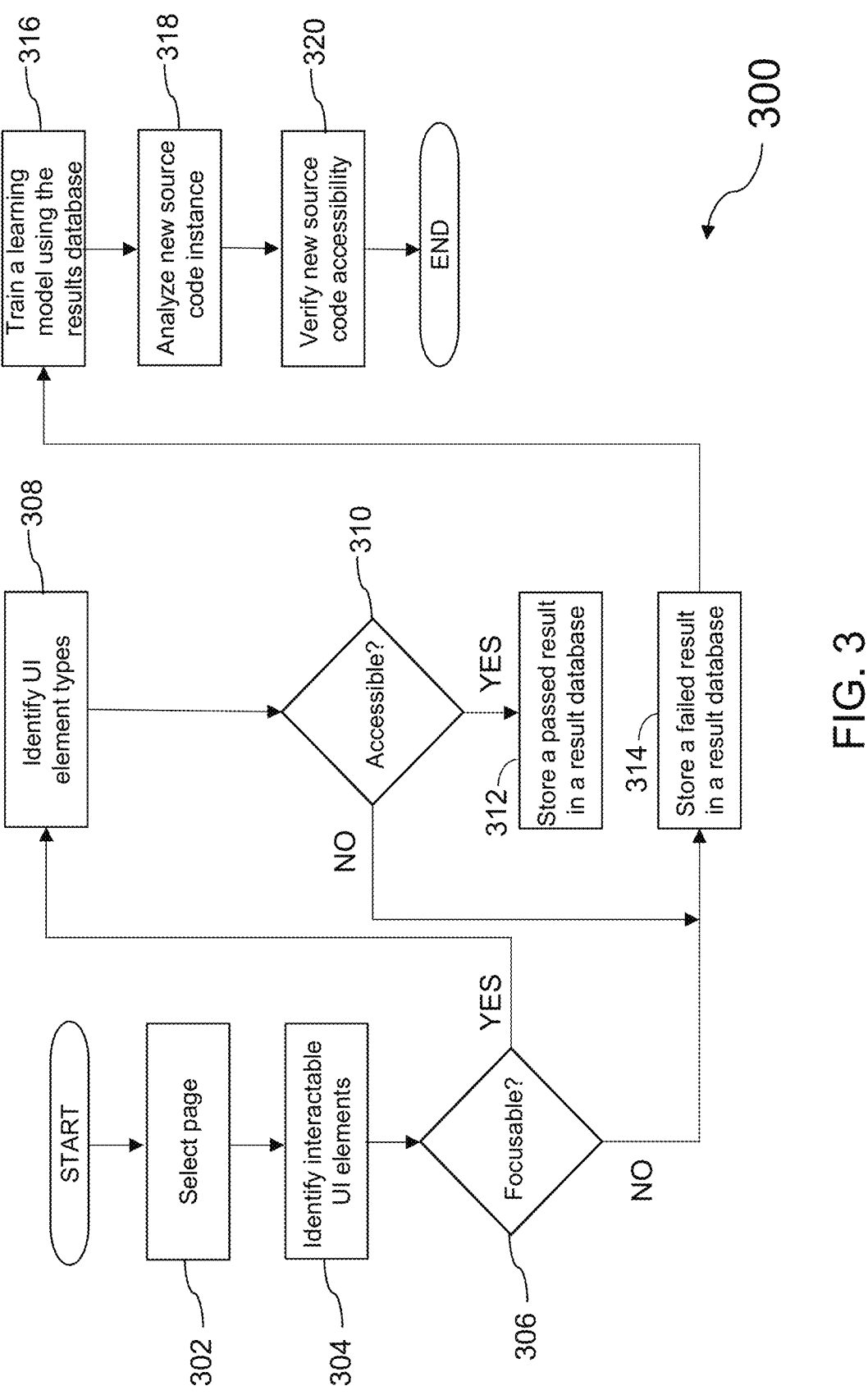
FIG. 3 is a flowchart depicting an accessibility management method in accordance with at least one embodiment of the present invention.

FIG. 3 is a flowchart depicting an accessibility testing method 300 in accordance with at least one embodiment of the present invention. As depicted, accessibility testing method 300 includes selecting (302) a page, identifying (304) interactable UI elements, filtering (306) focusable UI elements, identifying (308) UI element types, determining (310) whether the UI element is accessible, storing (312) a passed result in a result database, storing (314) a failed result in a result database, training (316) a learning model using the results database, analyzing (318) a new source code instance, and verifying (320) the new source code accessibility.

Selecting (302) a page may include identifying a webpage of interest to be analyzed according to the following steps. In at least some embodiments, selecting (302) a page includes identifying a webpage currently in development. In general, selecting (302) a page includes identifying a webpage with elements intended to be interactive to be tested in accordance with accessibility requirements.

Identifying (304) interactable UI elements may include analyzing the selected page to identify one or more UI elements which are interactable by a user. In at least some embodiments, identifying (304) interactable UI elements includes identifying elements which include one or more interactivity indicators. Interactivity indicators may be any element attributes in source code which are generally associated with interactive elements of a webpage. In at least some embodiments, interactable UI elements include, but are not limited to, buttons, links, drop down lists, user input (text), and user input (non-text).

Filtering (306) focusable UI elements may include determining, for an interactable element of the identified interactable elements, whether the element is focusable. Focusable elements are elements which a user can navigate to via a keyboard. Filtering (306) focusable UI elements may include determining whether an element includes syntax typically associated with an interactive element. In some embodiments, filtering (306) focusable UI elements includes testing an element to determine whether it is focusable. For the elements which are found to be focusable (306, yes branch), the method continues by identifying (308) UI element types. For the elements which are found to not be focusable (306, no branch), the method continues by storing (314) a failed result in the result database.

Identifying (308) UI element types may include analyzing the UI element attributes of the UI elements which are focusable to identify one or more corresponding UI element types. In at least some embodiments, identifying (308) UI element types includes making a comprehensive list of UI element types which are represented in the set of focusable UI elements.

Determining (310) whether the UI element is accessible may include determining whether a UI element meets accessibility requirements. For example, determining (310) UI element accessibility may include determining whether said UI element is interactable via keyboard. In general, determining (310) whether a UI element is accessible includes determining whether elements of the same type as the UI element conform to accessibility requirements.

Storing (312) a passed result in a result database may include amending a results database or a table in a results database to indicate which element (or elements) have been determined as passing accessibility requirements. Similarly, storing (314) a failed result in a result database may include amending a results database or a table in a results database to indicate which element (or elements) have been determined as failing to meet accessibility requirements. Amending the database may include providing a data element to the database indicating whether an element has passed or failed the accessibility requirements.

Training (316) a learning model using the results database may include using the results in the results database and any metadata corresponding to the elements for which the results have been given to train a learning model to predict accessibility concerns. In at least some embodiments, training (316) a learning model may include using a machine learning algorithm to build a multiple hyperplane classification model with different kernel functions and adjusted parameters to find a best-fit model. An example of an appropriate prediction model implementation is described with respect to FIG. 8.

Analyzing (318) a new source code instance may include receiving a new source code instance to be tested using the trained learning model. In at least some embodiments, analyzing (318) the new source code instance includes identifying UI elements which are interactable and their corresponding element types. In general, analyzing (318) a new source code instance includes identifying element information to be provided to the trained learning model.

Verifying (320) the new source code accessibility may include providing any element information resulting from the source code analysis to the trained learning model. In at least some embodiments, verifying (320) the new source code accessibility includes further utilizing the trained learning model to determine whether the new source code instance meets a set of accessibility requirements based on the trained learning model's predictions corresponding to the element information as discerned. Verifying (320) the new source code accessibility may include providing an indicator indicating whether the new source code instance has passed or failed the accessibility verification. Such an indicator may further include an indication of which elements, if any, contributed to a failed accessibility verification.

FIG. 4 is a table 400 depicting UI element types and corresponding element attributes and examples in accordance with at least one embodiment of the present invention. As depicted, the first column of table 400 indicates various types of interactive elements. The second column of table 400 depicts element attributes corresponding to the type of element indicated in the first column. Similarly, the third column of table 400 depicts example implementations of the type of interactive element indicated by the first column.

FIG. 5 is an interactive elements table 500 in accordance with at least one embodiment of the present invention. As depicted, the first column of interactive elements table 500 indicates a unique ID corresponding to a specific element. The second column of interactive elements table 500 indicates the element name, and the third column of interactive elements table 500 indicates an element ID corresponding to the element type. The fourth column of interactive element table 500 indicates the element's style, and the fifth column indicates one or more properties of the element. The sixth column of interactive elements table 500 indicates the event's handle, and the seventh column indicates a label indicating whether the corresponding element has passed or failed the accessibility testing.

FIG. 6 depicts sample source code in accordance with at least one embodiment of the present invention. As depicted, FIG. 6 includes a pre-fix source code implementation 602 and a fixed source code implementation 604. With respect to pre-fix source code implementation 602, the bolded portion of the source code corresponds to an interactable element with a missing handle keyboard event. The fixed source code implementation 604 includes the underlined sections which were added to remedy the missing handle keyboard event of pre-fix source code implementation 602.

Figure 7A:
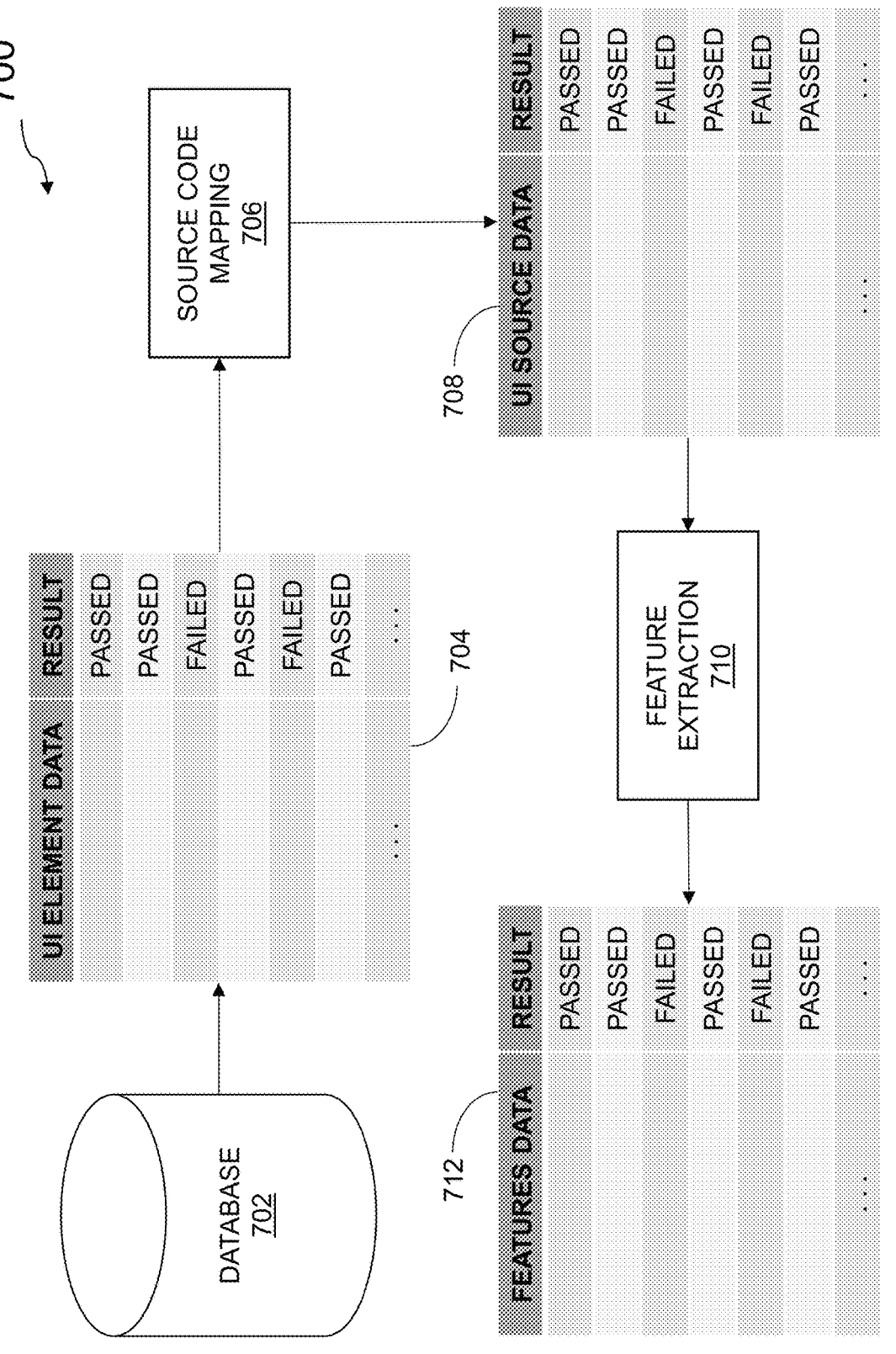
FIG. 7A is a dataflow diagram 700 in accordance with at least one embodiment of the present invention.

FIG. 7A is a dataflow diagram 700 in accordance with at least one embodiment of the present invention. As depicted, dataflow diagram 700 shows the transfer of UI element results data 704 from database 702 to a module responsible for source code mapping 706. Source code mapping 706 identifies the UI element source code 708 which corresponds to the UI element results data 704. Source code mapping 706 may additionally identify UI element type, attributes, event handler, style and other metadata corresponding to the UI element source code. The UI element source code 708 undergoes feature extraction 710 to provide features data 712.

Figure 7B:
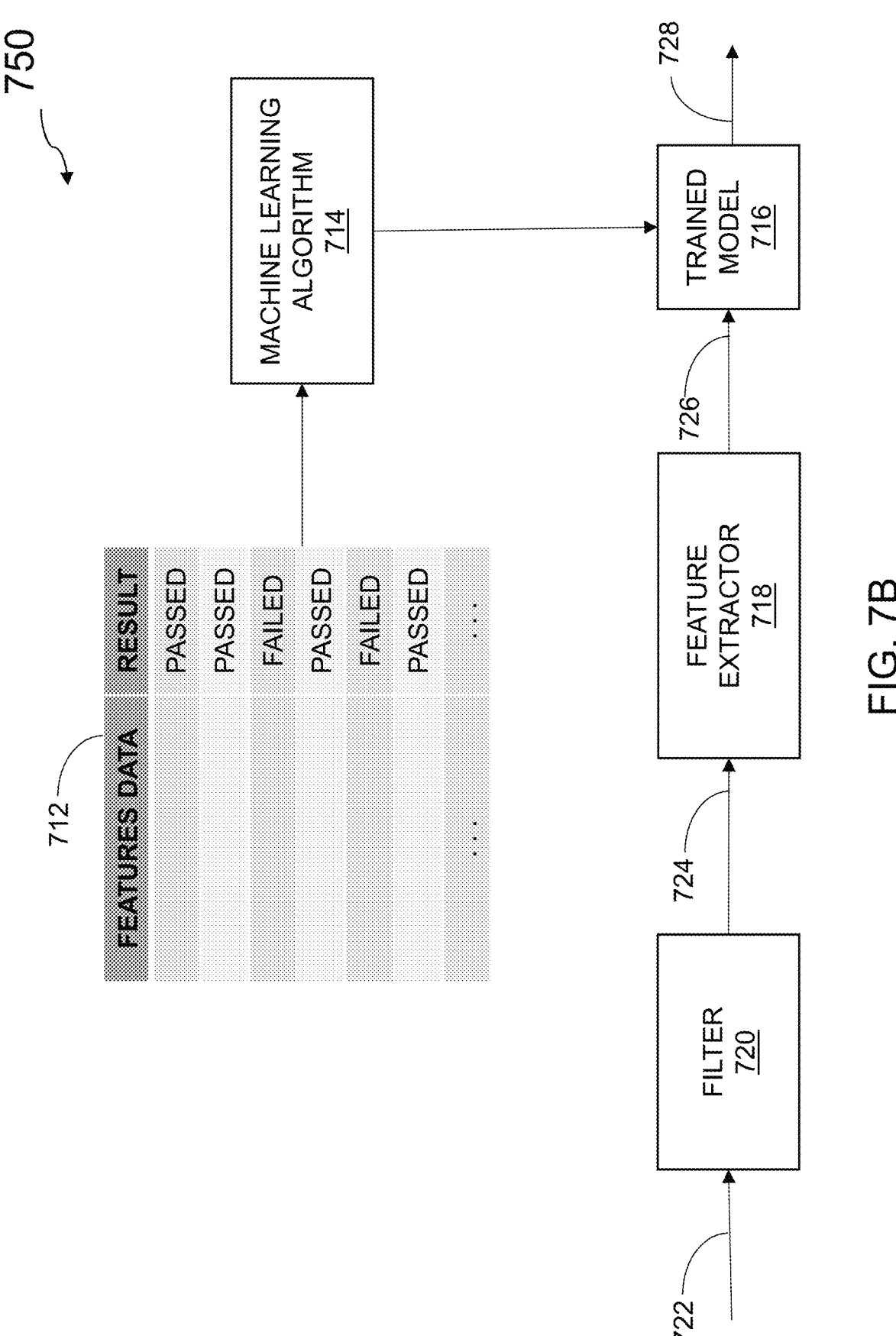
FIG. 7B is a dataflow diagram 750 in accordance with at least one embodiment of the present invention.

FIG. 7B is a dataflow diagram 750 in accordance with at least one embodiment of the present invention. As depicted, dataflow diagram 750 shows the transfer of features data 712 to a module responsible for implementing a machine learning algorithm 714. In at least some embodiments, machine learning algorithm 714 builds an accessibility issue detection model, or trained model 716, using the features data 712 as training data. Machine learning algorithm 714 may be configured to build a multiple hyperplane classification model with different kernel functions and adjusted parameters to find a best-fit model. Trained model 716 may be leveraged to determine an element's accessibility by feeding UI source code 722 through a filter 720 to provide UI source elements 724. Feature extractor 718 may be configured to receive and process UI source elements 724 to provide UI features 726. UI features 726 may be received and processed by trained model 716 to provide an accessibility status 728.

Figure 8:
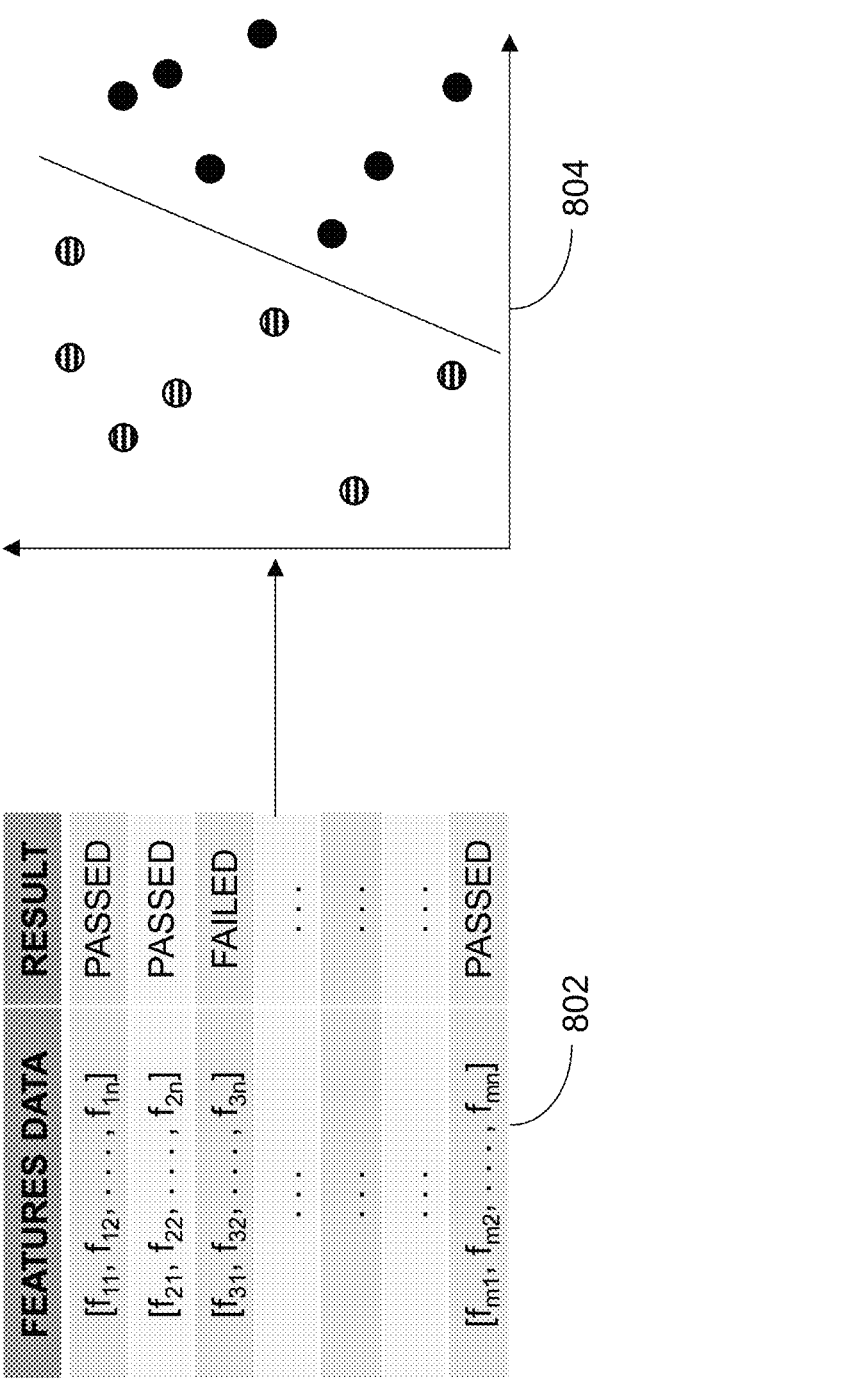
FIG. 8 depicts a keyboard accessibility detection model in accordance with an embodiment of the present invention.

FIG. 8 depicts a keyboard accessibility detection model in accordance with an embodiment of the present invention. As depicted, features data table 802 includes a column including features data for an element and an additional column including result data for the corresponding element. With respect to features data table 802, f indicates a specific extracted feature, m indicates a number of a corresponding source, and n indicates the number of the corresponding feature. Feature graph 804 defines a hyperplane as:

$$w_1 f_1 + w_2 f_2 + \ldots + w_n f_n + b = 0$$

wherein w is a weight vector corresponding to the corresponding feature, f is the extracted feature, and b is a bias constant. With respect to the hyperplane as described above:

$$\sum w_x f_x + b > 0 \text{ indicates a passed result; and}$$

-continued $$\sum w_x f_x + b < 0 \text{ indicates a failed result}$$

Figure 9:
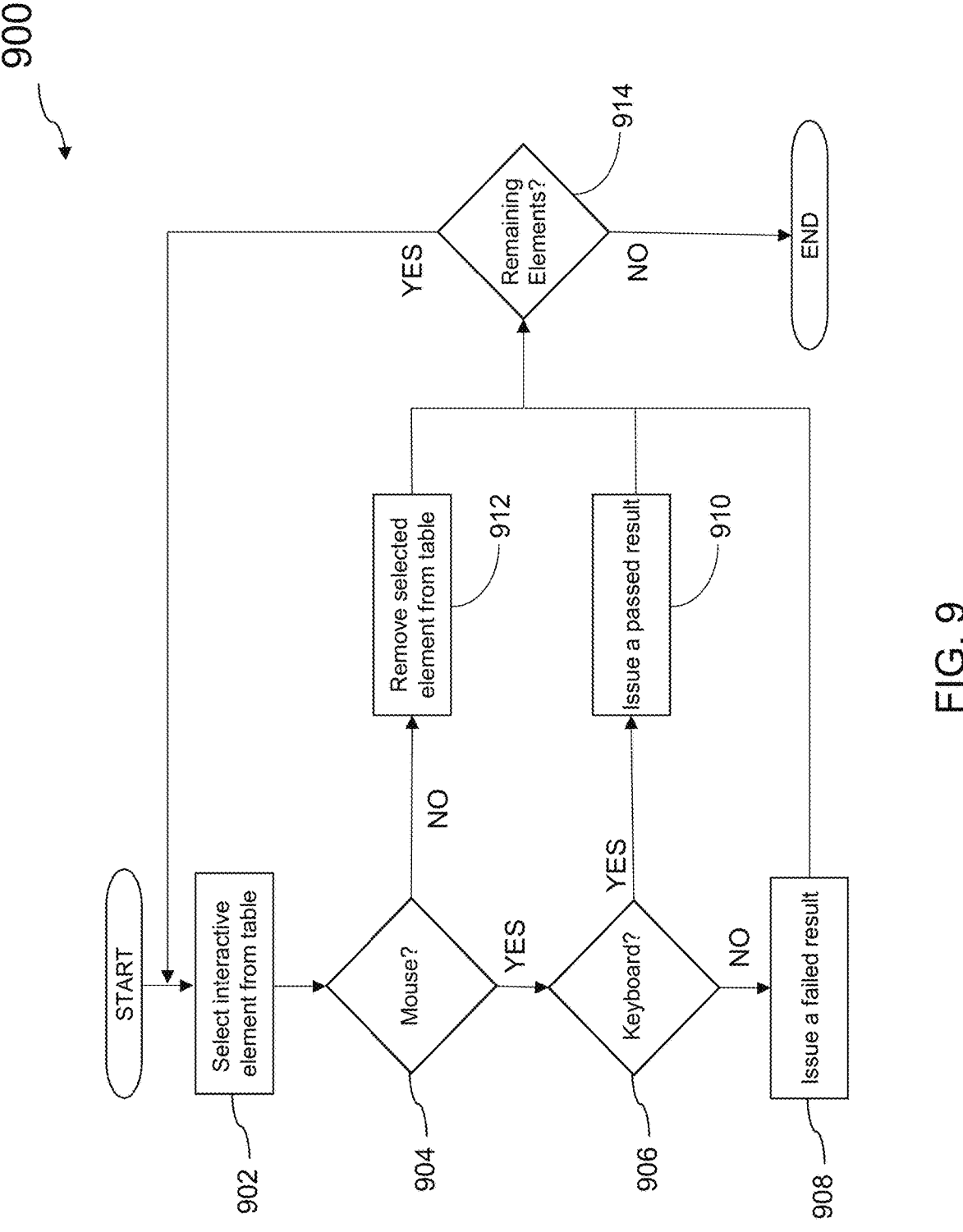
FIG. 9 is a flowchart depicting a data analysis method 900 in accordance with at least one embodiment of the present invention.

FIG. 9 is a flowchart depicting a data analysis method 900 in accordance with at least one embodiment of the present invention. As depicted, data analysis method 900 includes selecting (902) an interactive element, determining (904) whether the selected interactive element can be interacted with using a mouse, determining (906) whether an element can be interacted with using a keyboard, issuing (908) a failed result, issuing (910) a passed result, removing (912) the selected element from the interactive table, and determining (914) whether there are any remaining elements in the table. Data analysis method 900 may enable efficient accessibility testing relative to a mouse and a keyboard. It should be appreciated that while the described embodiment of data analysis method 900 is directed towards accessibility analysis with respect to a keyboard and a mouse, other embodiments of an appropriate data analysis method may be directed towards any number of user input devices beyond strictly a mouse and keyboard; the mouse and keyboard embodiment is intended to be exemplary, not limiting.

Selecting (902) an interactive element may include selecting an element from an interactive elements table for testing. Determining (904) whether the selected interactive element can be interacted with using a mouse may include analyzing the source code corresponding to the selected element to determine whether the code includes attributes enabling interaction via a mouse. If the selected element cannot be interacted with using a mouse (904, no branch), the method continues by removing the selected element from the table. If the selected element can be interacted with using a mouse (904, yes branch), the method continues by determining (906) whether an element can be interacted with using a keyboard.

Determining (906) whether an element can be interacted with using a keyboard may include analyzing the source code corresponding to the selected element to determine whether the code includes attributes enabling interaction via a keyboard. In other words, determining (906) whether an element can be interacted with using a keyboard includes determining whether the element is focusable. If the selected element cannot be interacted with using a keyboard (906, no branch), the method continues by issuing (908) a failed result. If the selected element can be interacted with using a keyboard (906, yes branch), the method continues by issuing (910) a passed result.

Issuing (908) a failed result may include issuing an indicator/notification specifying which element failed the accessibility requirement of being interactable via a keyboard. Similarly, issuing (910) a passed result may include issuing an indicator/notification specifying which element passed the accessibility requirement of being interactable via a keyboard. Removing (912) the selected element from the interactive table may include removing the corresponding element from one or more tables intended to include only elements which are interactive and thereby accessible via a mouse.

Determining (914) whether there are any remaining elements in the table includes determining whether there are any interactive elements which have not yet been issued either a failed result or a passing result. If it is determined that there are elements in the table which have not yet been tested (914, yes branch), the method continues by returning to select an interactive element from the table. If it is determined that there are not elements in the table which have not been tested (914, no branch) (in other words, all elements have been tested), the method concludes.

Figure 10:
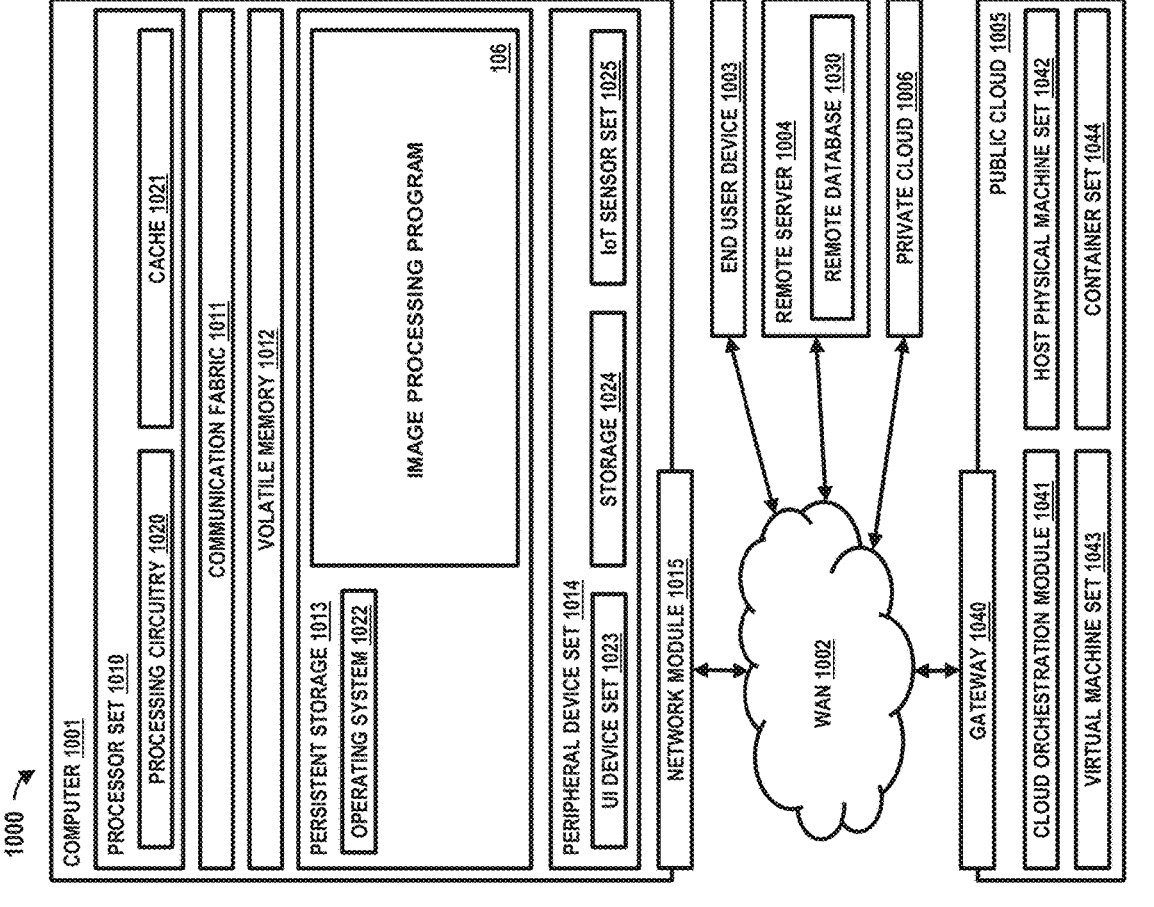
FIG. 10 illustrates an exemplary computer environment in which aspects of one or more of the illustrative embodiments may be implemented, and at least some of the computer code involved in performing the inventive methods may be executed, in accordance with an embodiment of the present invention.

FIG. 10 is an example diagram of a distributed data processing environment in which aspects of one or more of the illustrative embodiments may be implemented, and at least some of the computer code involved in performing the inventive methods may be executed, in accordance with an embodiment of the present invention, in accordance with an embodiment of the present invention. It should be appreciated that FIG. 10 provides only an illustration of one implementation and does not imply any limitations with regard to the environments in which different embodiments can be implemented. Many modifications to the depicted environment can be made.

Computing environment 1000 contains an example of an environment for the execution of at least some of the computer code involved in performing the inventive methods, such as accessibility management program 106. In addition to accessibility management program 106, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and accessibility management program 106, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

Computer 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

Processor set 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in accessibility management program 106 in persistent storage 1013.

Communication fabric 1011 is the signal conduction paths that allow the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

Persistent storage 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid-state storage devices. Operating system 1022 may take several forms, such as various known proprietary operating systems or open-source Portable Operating System Interface type operating systems that employ a kernel. The code included in accessibility management program 106 typically includes at least some of the computer code involved in performing the inventive methods.

Peripheral device set 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

Network module 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 1003 is any computer system that is used and controlled by an end user (for example, a customer of an enterprise that operates computer 1001) and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

Remote server 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

Public cloud 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:

identifying one or more webpages comprising a set of user interface (UI) elements;

analyzing the set of UI elements to identify a set of interactable elements, including automatically and programmatically parsing webpage source code corresponding to the one or more webpages;

classifying, for the set of interactable elements, each interactable element as focusable or as not focusable, thereby generating a subset of focusable interactable elements;

generating a first training set comprising first feature vectors computed from first source code corresponding to focusable interactable elements of the subset of focusable interactable elements, each first feature vector including a plurality of fields encoding values parsed from the first source code corresponding to a respective focusable interactable element; and automatically training, using the first training set and labels indicating accessibility outcomes for corresponding interactable elements, a machine-learned classification model, thereby producing an accessibility issue detection model configured to predict whether a new source code instance corresponding to a UI element satisfies keyboard accessibility requirements.

2. The computer-implemented method of claim 1, wherein analyzing the set of UI elements to identify the set of interactable elements further comprises: analyzing the webpage source code corresponding to the one or more webpages to identify one or more element types corresponding to the set of UI elements.

3. The computer-implemented method of claim 2, further comprising: determining which element types of the one or more identified element types correspond to the subset of focusable interactable elements.

4. The computer-implemented method of claim 1, further comprising: storing one or more passed results in a results database, wherein the one or more passed results correspond to one or more interactable elements of the set of interactable elements which are included in the subset of focusable interactable elements.

5. The computer-implemented method of claim 1, further comprising: extracting second features from second source code corresponding to a subset of not focusable interactable elements generated based on the classification.

6. The computer-implemented method of claim 5, further comprising: updating the accessibility issue detection model using the extracted second features from the second source code corresponding to the subset of not focusable interactable elements as second training data.

7. The computer-implemented method of claim 1, further comprising: storing one or more failed results in a results database, wherein the one or more failed results correspond to one or more interactable elements of the set of interactable elements which are included in the subset of not focusable interactable elements.

8. The computer-implemented method of claim 1, further comprising: receiving a webpage to be tested; and using the accessibility issue detection model on one or more elements of the received webpage to determine whether the webpage meets a set of accessibility requirements.

9. A computer program product comprising:

one or more computer readable storage media and program instructions collectively stored on the one or more computer readable storage media, the stored program instructions comprising program instructions configured to:

identify a webpage comprising a set of user interface (UI) elements;

analyze the set of UI elements to identify a set of interactable elements, including automatically and programmatically parse webpage source code corresponding to the one or more webpages;

classify, for the set of interactable elements, each interactable element as focusable or as not focusable, thereby generating a subset of focusable interactable elements;

generate a first training set comprising first feature vectors computed from first source code corresponding to focusable interactable elements of the subset of focusable interactable elements, each first feature vector including a plurality of fields encoding values parsed from the first source code corresponding to a respective focusable interactable element; and automatically train, using the first training set and labels indicating accessibility outcomes for corresponding interactable elements, a machine-learned classification model, thereby producing an accessibility issue detection model configured to predict whether a new source code instance corresponding to a UI element satisfies keyboard accessibility requirements.

10. The computer program product of claim 9, wherein the program instructions to analyze the set of UI elements to identify the set of interactable elements further comprises: instructions to analyze the webpage source code corresponding to the one or more webpages to identify one or more element types corresponding to the set of UI elements.

11. The computer program product of claim 9, the program instructions further comprising: instructions to store one or more passed results in a results database, wherein the one or more passed results correspond to one or more interactable elements of the set of interactable elements which are included in the subset of focusable interactable elements.

12. The computer program product of claim 9, the program instructions further comprising: instructions to extract second features from second source code corresponding to a subset of not focusable interactable elements generated based on the classification.

13. The computer program product of claim 12, the program instructions further comprising: instructions to update the accessibility issue detection model using the extracted second features from the second source code corresponding to the subset of not focusable interactable elements as second training data.

14. The computer program product of claim 9, the program instructions further comprising: instructions to store one or more failed results in a results database, wherein the one or more failed results correspond to one or more interactable elements of the set of interactable elements which are included in the subset of not focusable interactable elements.

15. A computer system comprising: one or more computer processors;

one or more computer readable storage media;

program instructions collectively stored on the one or more computer readable storage media for execution by at least one of the one or more computer processors, the stored program instructions comprising program instructions to:

identify a webpage comprising a set of user interface (UI) elements;

analyze the set of UI elements to identify a set of interactable elements, including automatically and programmatically parse webpage source code corresponding to the one or more webpages;

classify, for the set of interactable elements, each interactable element as focusable or as not focusable, thereby generating a subset of focusable interactable elements;

generate a first training set comprising first feature vectors computed from first source code corresponding to focusable interactable elements of the subset of focusable interactable elements, each first feature vector including a plurality of fields encoding values parsed from the first source code corresponding to a respective focusable interactable element; and automatically train, using the first training set and labels indicating accessibility outcomes for corresponding interactable elements, a machine-learned classification model, thereby producing an accessibility issue detection model configured to predict whether a new source code instance corresponding to a UI element satisfies keyboard accessibility requirements.

16. The computer system of claim 15, wherein the program instructions to analyze the set of UI elements to identify the set of interactable elements further comprises: instructions to analyze the webpage source code corresponding to the one or more webpages to identify one or more element types corresponding to the set of UI elements.

17. The computer system of claim 15, the program instructions further comprising: instructions to store one or more passed results in a results database, wherein the one or more passed results correspond to one or more interactable elements of the set of interactable elements which are included in the subset of focusable interactable elements.

18. The computer system of claim 15, the program instructions further comprising: instructions to extract second features from second source code corresponding to a subset of not focusable interactable elements generated based on the classification.

19. The computer system of claim 18, the program instructions further comprising: instructions to update the accessibility issue detection model using the extracted second features from the second source code corresponding to the subset of not focusable interactable elements as second training data.

20. The computer system of claim 15, the program instructions further comprising: instructions to store one or more failed results in a results database, wherein the one or more failed results correspond to one or more interactable elements of the set of interactable elements which are included in the subset of not focusable interactable elements.

* * * * *